United States Patent [19]
Toro

[11] 4,428,412
[45] Jan. 31, 1984

[54] PORTABLE INSTANT SHADE

[76] Inventor: Andras I. Toro, 7234 Plank St., El Cerrito, Calif. 94530

[21] Appl. No.: 439,572

[22] Filed: Sep. 29, 1982

[51] Int. Cl.³ .............................................. E04F 10/06
[52] U.S. Cl. .............................. 106/23 R; 160/DIG. 3
[58] Field of Search ............ 160/23 R, 23 C, DIG. 3, 160/31, 72, 81, 66; 38/DIG. 1, DIG. 2

[56] References Cited

U.S. PATENT DOCUMENTS

| | | | |
|---|---|---|---|
| 1,180,124 | 4/1916 | Foedisch | 160/31 |
| 1,637,763 | 8/1927 | Clegg | 160/23 R |
| 1,698,871 | 1/1929 | Beatty | 160/23 R |
| 1,755,736 | 4/1930 | Jensen | 160/72 |
| 1,929,314 | 10/1933 | Ishi | 160/31 |
| 2,561,188 | 7/1951 | Ferguson | 160/23 R |
| 2,583,824 | 1/1952 | Dwinnell et al. | 160/66 |
| 3,584,910 | 6/1971 | Lupul | 160/23 R |

Primary Examiner—Peter M. Caun
Assistant Examiner—Cherney S. Lieberman
Attorney, Agent, or Firm—Robert Charles Hill

[57] ABSTRACT

A portable instant shade device provides protection against glaring sunlight at the interior of motor vehicles or boats. The main body of the device consists of a cylindrical casing housing the shade and the shade roller, which casing has a longitudinal slot at the bottom in which the shade passes through. At each end of the cylindrical casing is a cap which receives the end of the shade roller, holds the foldable grooved arms and provides attachment for the mounting means. The shade roller is a usual spring type, operated as an ordinary window shade. The portable instant shade may be easily mounted detachably with suction cups or any other ordinary clamping device to assure adjustability to any desired position for the purpose of shading the interior of motor vehicles or boats.

1 Claim, 7 Drawing Figures

PORTABLE INSTANT SHADE

BACKGROUND OF THE INVENTION

The following patents are the prior art closest to the present invention known to the inventor:

U.S. Pat. No. 1,298,739—Langford, Apr. 1, 1919
U.S. Pat. No. 1,621,972—Darby, Mar. 22, 1927

All of the enumerated patents disclosed devices for detachable anti-glare shield for motor vehicle and the like. Langford discloses an awkward adjustable clamping device for his auto shade not readily applicable to modern motor vehicles. The Darby device employs a complex ratchet system with compression cup attachment for his anti-glare shield. These patents do not exhibit the use of a foldable grooved arm which will prevent sagging swinging of the shade nor the easy portability and inexpensive modern construction.

SUMMARY OF THE INVENTION

The portable instant shade of the present invention provides a simple, light, practical, inexpensive shade to protect against glaring sunlight for the interior of a motor vehicle or boat, which can easily and single handedly be mounted or removed from the interior surface of said motor vehicle or boat's window.

It is the primary object of the present invention to provide a new and improved inexpensive portable instant shade which could be folded up and stored.

Another object is to provide a device which can be efficiently mounted, operated and removed by one person.

A further object of the invention is to provide structure of the character described which is economical to produce with modern technology, long lasting in usage due to its design and material and effective in its purpose.

DESCRIPTION OF THE PREFERRED EMBODIMENT

Figure 1:
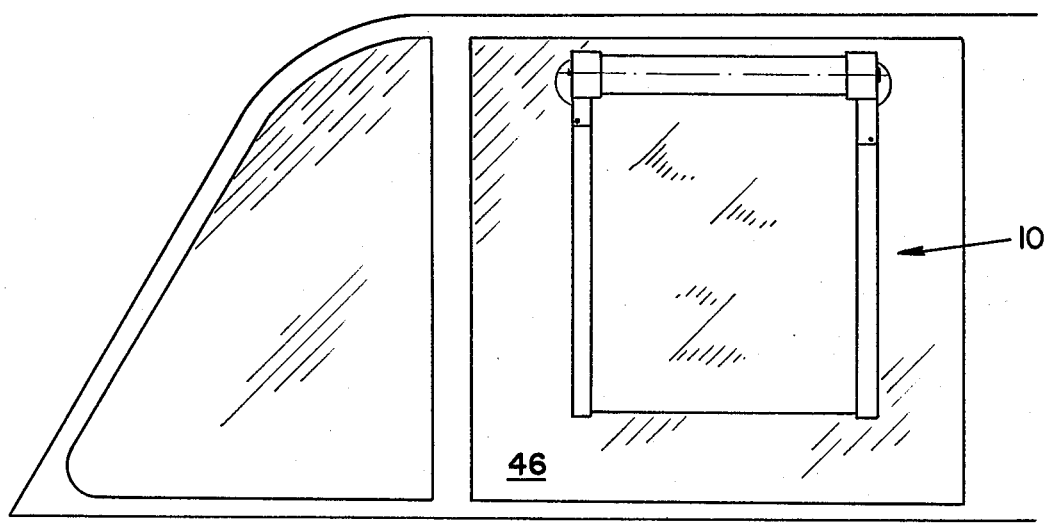
FIG. 1 is a depiction of the present invention in use on the side window of an automobile.

Referring to the drawings, there is shown the portable instant shade of this invention generally indicated 10 which is adaptable for use to shade against glaring sunlight. The portable instant shade 10 has a cylindrical casing 12 to house the shade roller 22 and the shade 30. This shade roller 22 is a usual spring type well-known in the art and operated as an ordinary window shade. The shade itself 30 may be a colored translucent material such as a plastic sheet or may be of vinyl construction. It should be understood that any suitable material providing shade may be used without departing from the spirit of the invention.

Figure 5:
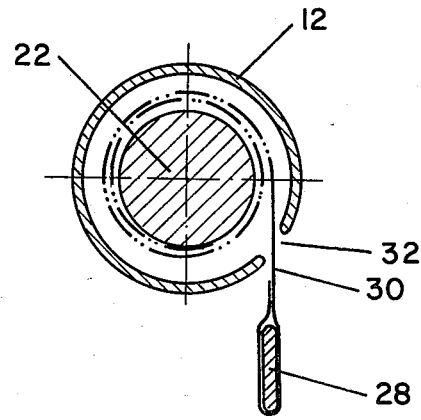
FIG. 5 is a cross-sectional view taken at the middle of the device with the shade in the rolled-up position.

The shade 30 is secured to the roller 22 at one end and is adopted to be wound or unwound from the roller 22 by passing through a longitudinally extending slot 32 as shown in FIG. 5. This slot extends the full length of the casing 12 and is wide enough to accommodate the thickness and any slight angular movement of the shade without any friction. The lower end of the shade 30 is provided with a folded seam in which a reinforcing stick 28 is mounted. This reinforcing stick 28 prevents the shade's lower end from rolling inside the casing 12 and also provides a finger hold for the operation of the shade 30.

It should be understood that portable instant shade 10 may be adjusted on the interior of any automobile or boat to suit the convenience of the passenger and that the shade 30 may be raised or lowered to the desired position in the same manner as an ordinary window shade.

At each end of the cylindrical casing 12 are caps 14 and 16 having legs 34 and 36, respectively. Caps 14 and 16 slide over and are secured on the casing 12 in such a way that the slot of casing 12 and the channel 38 between the legs 34 or 36 will line up.

Figure 4:
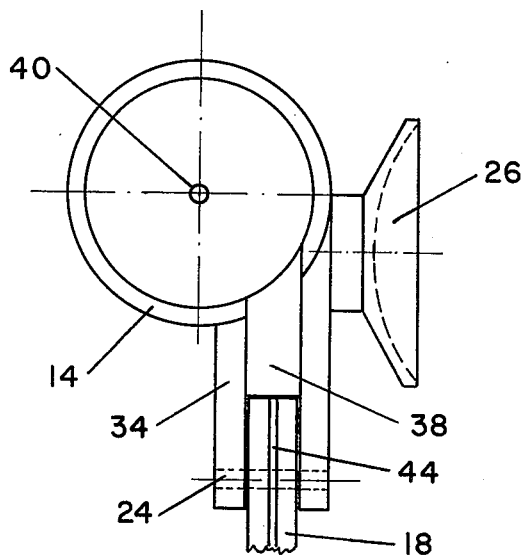
FIG. 4 is a side view of the cap showing the short leg with a portion of the arm depending therefrom.

Caps 14 and 16 receive the end of the shade roller 22 in the normal fashion which is well-known. At the center of cap 14 as shown in FIG. 4 is a hole 40 to accommodate the roller 22 spinning end while cap 16 has a slot (not shown) at its center to receive the fixed ratchet end of the roller 22.

Figure 2:
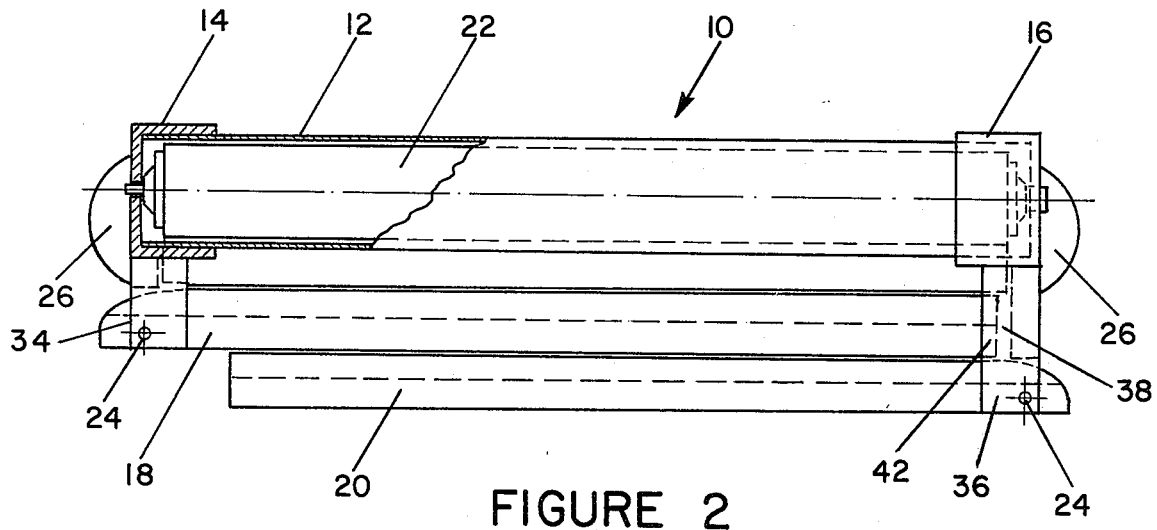
FIG. 2 is a front elevational view of the present invention in folded or stowed position with the left side partially broken away on the centerline.
Figure 3:
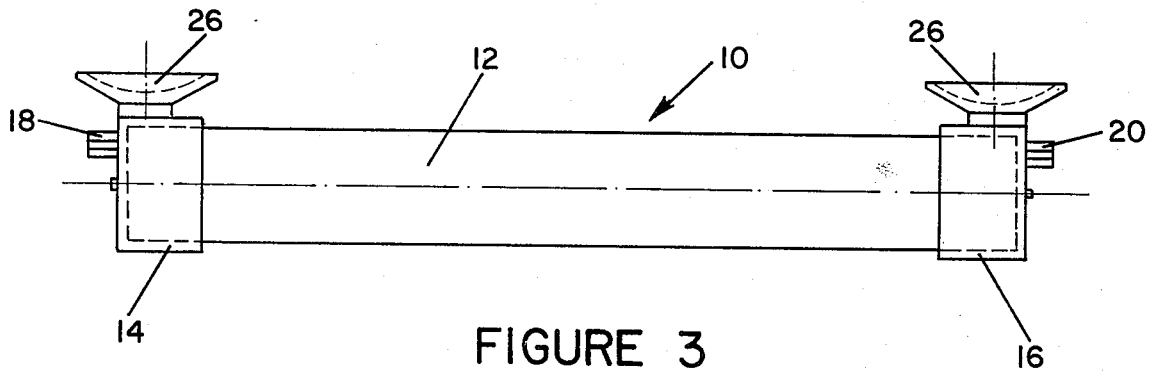
FIG. 3 is a top view of the present invention in folded or stowed position.
Figure 6:
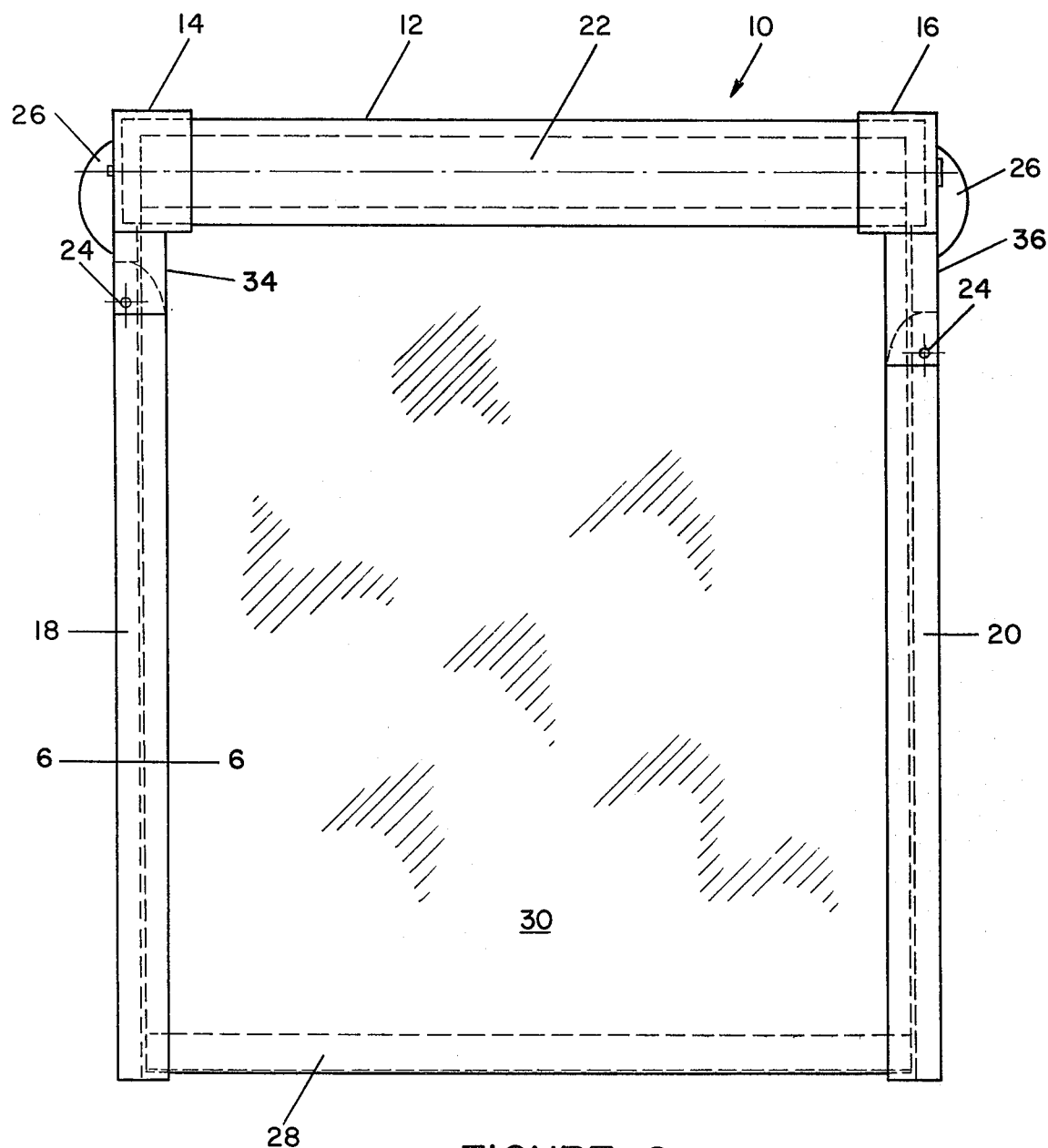
FIG. 6 is a front elevational view of the present invention in unfolded or open position with the shade pulled down.

At the end of legs 34 and 36 are attached foldable grooved arms 18 and 20, respectively, by pins 24 to assure precise folding motion from the stowed or folded position of FIG. 2 to the open position of FIG. 6. These foldable grooved arms 18 and 20 are unequal in length for obvious reasons. The longer arm 18 is attached to the short leg 34 and the short arm 20 is attached to the long legs 36, which arrangement provides the same overall length in the open position as shown in FIG. 6. The foldable grooved arms 18 and 20 supply the shade 30 with a rigid frame and track to prevent sagging and swinging away from the window.

Figure 7:
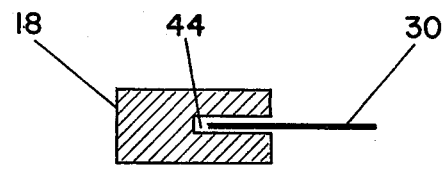
FIG. 7 is a view taken substantially as indicated along lines 6—6 of FIG. 6 showing the groove within a foldable arm.

As shown in FIG. 2, the outer end 42 of arm 18 is of sufficient length that in the folded position it slides into channel 38 on leg 36. This arrangement prevents any lateral movement of arm 18 in the folded position. The grooves 44 (FIG. 7) in arms 18 and 20 are deep enough to provide proper tracking for the shade 30 and wide enough not to create any added friction to the shade's travel.

Mounted on the back of caps 14 and 16 are suction cups 26 or ordinary construction. These suction cups 26 provide a means for positioning the device 10 to a window 46 (FIG. 1), but they are not unique to the invention. It should be understood that any suitable mechanical mounting clips or clamps of ordinary construction could also be used as a mounting means.

In actual operation the device 10 in its folded or stowed position is attached to a window 46 by mounting means 26. Arms 20 and 18 are then pivoted to an open or extended position perpendicular to the centerline of the roller 22 forming an extension of legs 36 and 34, respectively. The operator then grasps reinforcing stick 28 and pulls downward, thus causing the shade 30 to unwind from roller 22 through slot 32 of casing 12 and into channels 38 of the legs 34 and 36 and then into grooves 44 within each arm 18 and 20, thereby providing an instant shade to combat glaring sunlight.

To dismantle the device 10, the operator simply rolls up the shade 30 by means of reinforcing stick 28, pivots long arm 18 so that outer end 42 nests within channel 38 of leg 36, pivots short arm 20 adjacent to arm 18 and dislodges the attaching means 26 from the window 46. The device 10 is then ready for handy storage.

While a certain preferred embodiment of the invention has been specifically disclosed, it should be understood that the invention is not limited thereto as many variations will be readily apparent to those skilled in the art and the invention is to be given its broadest possible interpretation within the terms of the following claims.

I claim:

1. A portable shade device for use in vehicles and the like for selective shading purposes, comprising:
   (a) a casing having a cap at each end,
   (b) elongated roller means within the casing carrying a flexible shade capable of being retracted into a rolled up position on the roller means and extended to provide shade,
   (c) attaching means arranged on the roller means for mounting the roller means on an interior surface of the vehicle,
   (d) one leg having a channel therein depending from each cap, one leg being longer than the other leg,
   (e) an arm pivotally connected to each leg having a groove therein, one arm being longer than the other arm, the arms being adopted for pivotal movement between a fixed position folded near the casing to provide a compact portable configuration for the retracted shade and a second position extending downward from the legs with the grooves in the arms providing a track to receive the shade and support it in its extended position
   (f) the outer end of the long arm fitting into the channel of the other leg in the folded position.

* * * * *